UNITED STATES PATENT OFFICE.

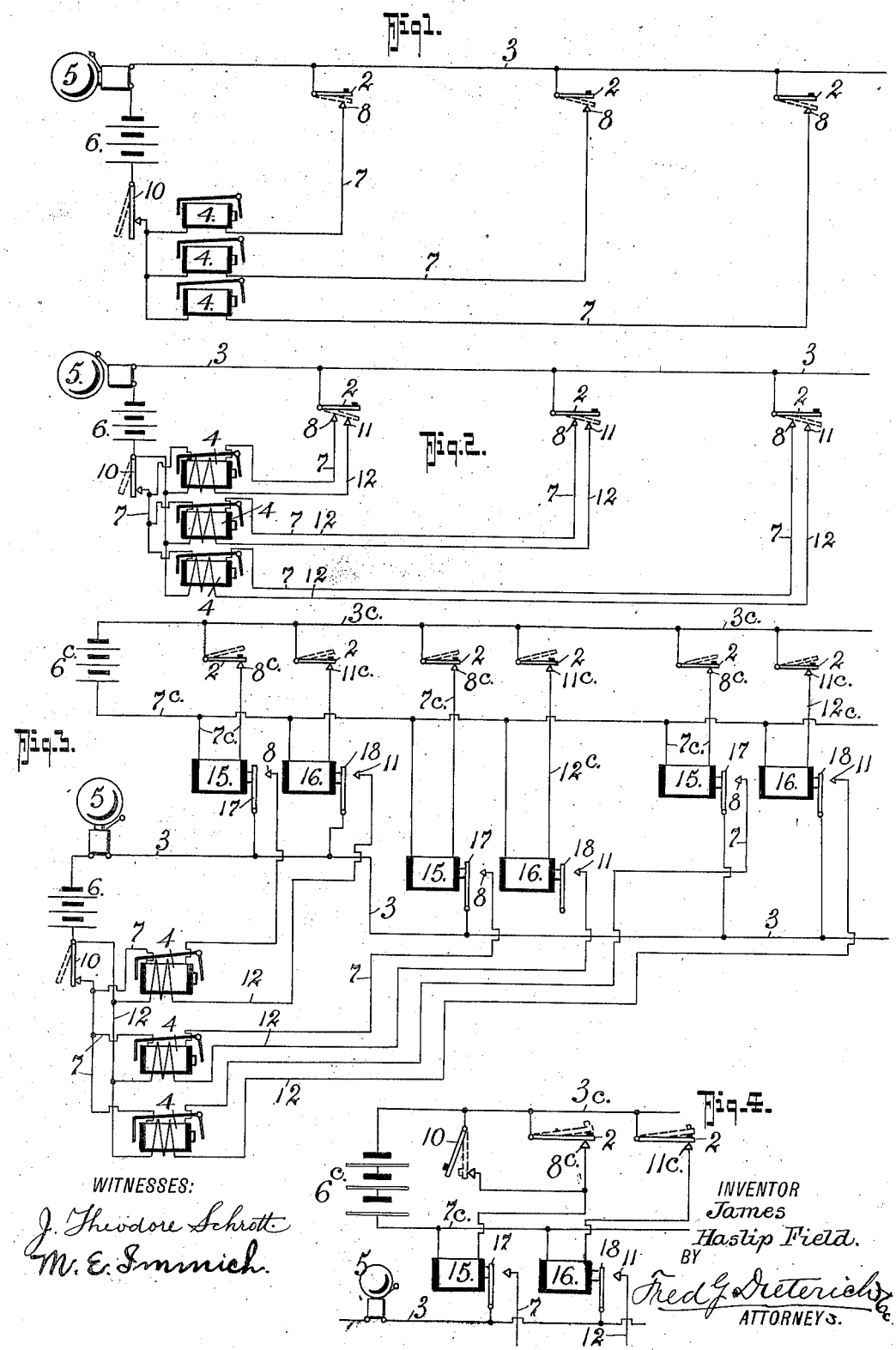
J. H. FIELD.
ELECTRICAL FIRE ALARM SYSTEM.
APPLICATION FILED FEB. 3, 1909.
976,645.
Patented Nov. 22, 1910.
INVENTOR
James Haslip Field.

JAMES HASLIP FIELD, OF VICTORIA, BRITISH COLUMBIA, CANADA, ASSIGNOR TO THE CANADIAN TAYLOR AUTOMATIC FIRE ALARM AND CALL BELL COMPANY, LIMITED, OF VICTORIA, CANADA, A CORPORATION.

ELECTRICAL FIRE-ALARM SYSTEM.

976,645.          Specification of Letters Patent.    Patented Nov. 22, 1910.

Application filed February 3, 1909. Serial No. 475,844.

*To all whom it may concern:*

Be it known that I, JAMES HASLIP FIELD, a subject of the King of Great Britain, residing at Victoria, in the Province of British Columbia, Canada, have invented new and useful Electrical Fire-Alarm Systems, of which the following is a specification.

This invention relates to an electrical fire alarm system of that class wherein an open circuit is closed or a closed circuit opened to ring an alarm by thermostats when the temperature surrounding any one of them rises consequent on abnormal conditions beyond that for which it has been set.

The invention has been particularly designed for application to a fire alarm system wherein the thermostat contact is used in conjunction with the push button of an ordinary electrical call system where the thermostat instead of being on the ceiling, where any abnormal elevation of temperature in a room would naturally first be felt, is necessarily placed on the wall at a convenient height for the operation of the push button. Under these conditions the thermostat requires to be much more sensitive to a rise of temperature in order to get effective service from it as a fire alarm. When however the thermostats are so sensitive that they will act under the conditions named they are extremely liable to act under daily fluctuations of heat, and it is to guard against this contingency that the invention which is the subject of this application has been devised.

I overcome the difficulty by placing in the circuit, in some position where it will be subject to the same general conditions of temperature as those in the line, a master thermostat so adjusted that it will act to open or close the circuit, according as it is a normally open or a normally closed circuit system, at a temperature slightly less than that for which the thermostats of the circuit are adjusted; so that if the general temperature is such that it might operate any one of the circuit thermostats to ring an alarm the same general rise of temperature would operate the master thermostat to open or to close the circuit as the case may be to prevent that alarm being rung. A general rise in temperature will thus not permit an alarm to be rung by any one of these delicately set thermostats, but a local rise though slight as in the initial stage of a fire in any room or part of the building will ring an alarm, as the master thermostat which controls the circuit will not have been acted upon to open or close it as the system in use may require.

In the application of the system there are several features of arrangement incidental to its use to which attention will be called in the course of the following specification which fully describes various applications of the system, reference being made to the drawings by which it is accompanied, in which:

Figure 1, illustrates diagrammatically the application of a master thermostat to control a simple open circuit, Fig. 2, shows a practical application of the principle to an open circuit thermostat system Fig. 3, the application of a master thermostat to control a closed circuit system, and Fig. 4, a portion of a circuit in which the master thermostat is normally open and closes under a general rise of temperature.

Fig. 1 of these drawings is given merely to illustrate the principle under which the master thermostat is introduced to control the system and prevent a slight general rise in temperature from ringing an alarm. In this drawing 2, 2, 2, represent the line thermostats which are normally open, and close upon their contacts 8 either by manual application of a push button or by an elevation of temperature. The thermostats 2 are connected through a bell 5 to one of the poles of the operating battery 6 by a wire 3 and the contacts 8 by wires 7 to the other pole of the battery each wire passing through the coil of its annunciator. Thus if any thermostat is brought into engagement with its contact 8 either manually or by the necessary rise in temperature the circuit is closed and the alarm bell rung while the location of the thermostat at which contact has been made is announced. As the association of a push button with a thermostat necessitates the thermostat being placed on the wall it will require to be adjusted to act at a temperature less than that at which it would be set were it placed in the ceiling of a room. To prevent a slight general rise of temperature, and therefore presumably one that does not necessitate an alarm, from ringing such alarm, a master thermostat 10 is introduced in the common wire of the circuit which thermostat is normally closed on its contact but is adjusted to break contact at a temperature slightly less than that for which the line thermostats are set so that before a general rise of temperature over the whole system can ring in a false alarm the master thermostat will have opened the circuit and will prevent such alarm being given. This illustrates the principle under which the master thermostat is introduced but the diagram does not represent a practical working system for it will be obvious that by a general rise in temperature such as to act upon the master thermostat to open the circuit the system is rendered useless for either a call bell or alarm.

Fig. 2 represents a practical working system in which the objection just referred to is overcome. In it each thermostat 2 is provided with a secondary contact 11 which is connected through a separate wire 12 through a separate coil on the annunciator 4 to the battery 6 and the master thermostat 10 is introduced in the common wire which connects the several wires 7 before such common wire of 7 is joined by the common wire of the secondary contacts 12. This master thermostat is as before normally closed but will open the circuit to prevent a false alarm being rung if a slight general rise of temperature occurs, such as would, acting on the line thermostats 2 bring them into engagement with their contacts 8; but if a thermostat 2 is manually closed by its push button or if a further rise of temperature occurs locally such as might be occasioned by an incipient fire, the thermostat 2 will engage its secondary contact 11 to close the circuit, and as the connection 12 from each of the secondary contacts, after passing through its own annunciator coil is connected on the battery side of the master thermostat 10 its circuit has not been opened at the master thermostat and the alarm is rung.

Fig. 3 shows the application of the master thermostat to a closed circuit system wherein the line circuit is normally closed and the current from its battery 6 holds open the alarm bell circuit by means of relays. For convenience in illustration the primary and secondary contacts are shown in this diagram as having a separate thermostat for each though in practice one thermostat only may be used and the contacts will have such resilience as will allow the thermostat to move off first one and then the other. As the operation of the contacts of the line circuit and its alarm bell circuit are practically the same, the connections and parts which perform similar functions are similarly numbered in each circuit but the line circuit references are differentiated from those of the bell circuit by the affix "c" to indicate "closed."

The upper part of the diagram represents the closed line circuit and the lower part in finer lines the alarm bell circuit; though it must be understood in applying this system that the relays of the several contacts may be placed adjacent to their annunciators and the alarm bell.

The line thermostats 2 are connected by $3^c$ to one pole of the battery $6^c$ and the primary and secondary contacts $8^c$ and $11^c$ by $7^c$ and $12^c$ respectively each through the coil of separate relays 15 and 16 to the other pole of the battery. With this arrangement while the line circuit is normally closed, an elevation of temperature beyond that for which the line thermostats are adjusted to break from their contacts will cause the battery circuit to be broken and the relay armature of the acting thermostat released.

The armatures 17 and 18 of the primary and secondary relays 15 and 16 are connected by 3 through the alarm bell to one pole of its battery 6 and when released from their respective relay magnets will fall into engagement with contacts 8 or 11 which are connected by 7 and 12 through separate coils of the annunciators 4 to the other pole of the battery. In the common wire of the connection 7 to the battery 6 is placed the master thermostat 10, normally closed as before and adjusted to break the circuit at a temperature slightly below that for which the line thermostats are adjusted to break from their primary contacts. The common wire 12 from the secondary contacts is, after passing through the coils of the annunciator, connected to the common wire 7 of the primary coils at a point between the master thermostat and the battery. With this arrangement when the line thermostats are exposed to a general rise of temperature above that for which they are adjusted and break from their primary contacts $8^c$, their relay armatures 17 are released to close the alarm bell circuit but the alarm cannot ring because the bell circuit has been broken by the master thermostat 10 which may be assumed to have been exposed to the same general rise of temperature. But if while this condition prevails the line circuit is broken at any secondary contact either by a manual application or by the exposure of that thermostat to a sufficient temperature the armature 18 of the relay 16 is released and by contact with 11 closes the alarm bell circuit, as the connection 12 of this circuit joins the common wire, between the master thermostat and the battery and the circuit has not therefore been interrupted by the action of the master thermostat.

The master thermostat has so far been described as acting to open a normally closed circuit but it may also be applied to close a normally open circuit. Fig. 4 shows the manner in which the master thermostat may be so applied. It represents a portion of the closed circuit system illustrated in Fig. 3 where a master thermostat normally open is introduced in a connection between 3ᶜ and 7ᶜ, between the contact 8ᶜ and the relay 15. This thermostat being normally open will close before the line thermostat breaks from its primary contact 8ᶜ and close a substitute circuit for the current through the relay which will therefore hold its armature 17 to maintain open the alarm bell circuit. With such an arrangement a master thermostat will require to be furnished for each line thermostat or loop in which a group of thermostats may be connected to one annunciator.

Although in the foregoing specification different systems have been described wherein the master thermostat has been applied it must not be assumed that the application of the master thermostat is to be confined to such systems; as my invention comprises the application of a master thermostat to control the action of the line thermostats where they would operate to ring an alarm by a slight general elevation of temperature and to the means for preventing that action of the master thermostat from preventing an alarm being rung when the rise of temperature has not been general or when a further elevation has been attained or the contact operated manually.

Having now particularly described my invention and the manner of its operation what I claim as new and desire to be protected in by Letters Patent is:

1. In an electrical alarm system of the character described, an alarm bell and battery connected in series therewith, a plurality of general thermostats in circuit with said battery and bell for operating the same, and a master thermostat coöperating with the aforesaid parts to render said general thermostats inoperative under predetermined conditions.

2. In an electrical alarm system, a battery circuit, magnets in said battery circuit, armatures coöperating with said magnets, general thermostats in circuit with said battery and magnets, an alarm coöperatively connected with the aforesaid parts to be controlled by said general thermostats, and thermostatic means coöperating with the aforesaid parts to render the said general thermostats inoperative under predetermined conditions.

3. In an alarm bell system, an open circuit including an alarm and general thermostats together with a source of electric energy therefor, said thermostats operating to close said circuit when the temperature is attained for which they have been adjusted, a master thermostat coöperating with the aforesaid parts which normally closes the circuit but, at a temperature slightly below that for which the general themostats have been set, will open the circuit and prevent the alarm being rung.

4. In an electrical alarm system of the class described wherein is provided an alarm circuit and a source of electric energy therefor, and line or general thermostats in said alarm circuit for controlling the ringing of said alarm, means for preventing the operation of the general thermostats under predetermined conditions, said means comprising a master thermostat coöperating with the aforesaid parts that will also control the ringing of an alarm under predetermined conditions.

5. In an electrical alarm system of the class described, a battery circuit, thermostats having primary and secondary contacts connecting with said battery circuit and a thermostatically controlled member also connected with said battery circuit for engaging said contacts at different temperatures, a master thermostat in the connection of the primary contacts with the battery circuit that will open that connection at a temperature slightly less than that for which the line thermostats are set and that will not break the circuit connecting the secondary contacts to the battery.

6. In an electrical alarm system the combination with a circuit in which is a battery and alarm bell, of line thermostats connected to one pole of the battery each thermostat having primary and secondary contacts which may be adjusted to be engaged by the thermostat at different temperatures, means for connecting the primary and secondary contacts to the other pole of the battery, and a master thermostat in the connection from the primary contact that will open the circuit at a temperature slightly less than that at which the line thermostats are set to close onto their primary contacts.

In testimony thereof I have signed my name to this specification in the presence of two subscribing witnesses.

JAMES HASLIP FIELD.

Witnesses:
ROWLAND BRITTAIN,
A. G. WOOLSEY.